May 25, 1926.
W. M. BARBER
1,585,818
SAWING AND GRINDING ATTACHMENT FOR TRACTORS
Original Filed Feb. 23, 1924   2 Sheets-Sheet 1
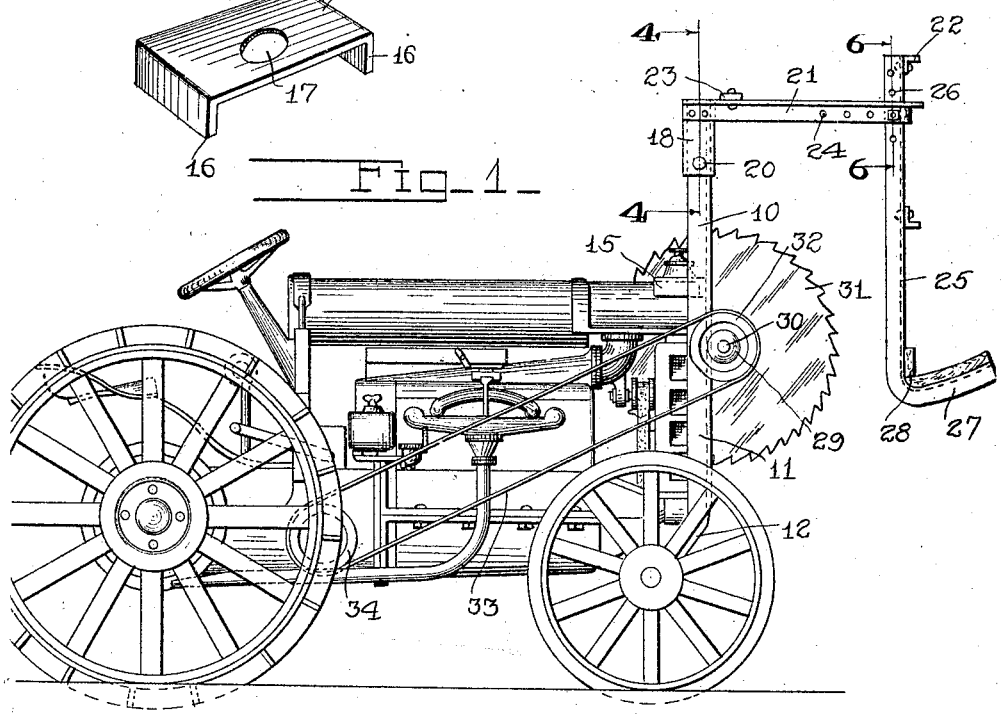
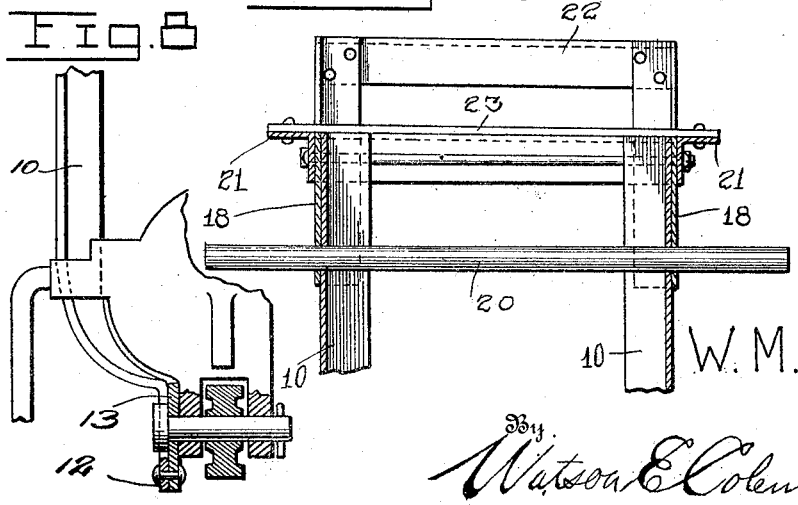

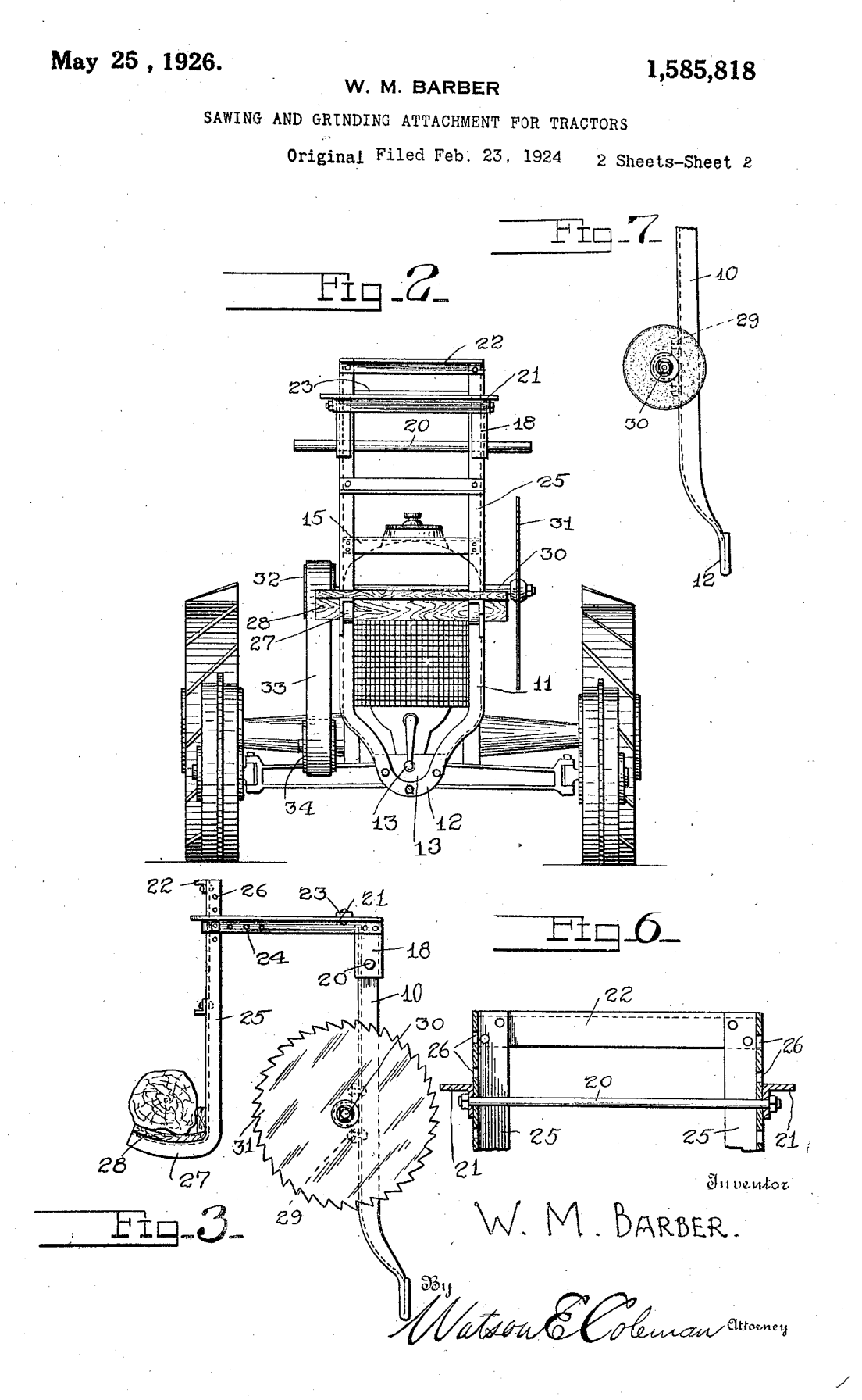

May 25, 1926.

W. M. BARBER 1,585,818

SAWING AND GRINDING ATTACHMENT FOR TRACTORS

Original Filed Feb. 23, 1924   2 Sheets-Sheet 2

Inventor
W. M. BARBER.
By Watson E. Coleman, Attorney

Patented May 25, 1926.

1,585,818

UNITED STATES PATENT OFFICE.

WILLIAM M. BARBER, OF WHITWELL, TENNESSEE.

SAWING AND GRINDING ATTACHMENT FOR TRACTORS.

Application filed February 23, 1924, Serial No. 694,755. Renewed April 3, 1926.

This invention relates to attachments for tractors, such as Fordson tractors, and particularly to an attachment whereby a saw may be mounted upon the Fordson tractor and driven therefrom, the attachment being provided with a swinging table or cradle whereby the logs may be brought into engagement with the saw.

A further object is to provide an attachment of this kind which will permit the substitution of a grinding wheel upon the saw mandrel and in place of the saw.

A still further object is to provide an attachment of this character which is very simple, which when applied is rigidly supported, which may be readily removed at any time, but which may remain upon the Fordson tractor without in any way interfering with its ordinary operation and use.

Other objects will appear in the course of the following description.

My invention is illustrated in the accompanying drawings, wherein:—

Figure 1 is a side elevation of a tractor with my attachment applied thereto;

Figure 2 is a front elevation of the construction shown in Figure 1;

Figure 3 is a side elevation of the attachment separated from the tractor;

Figure 4 is a section on the line 4—4 of Figure 1;

Figure 5 is a perspective detail view of the cap plate;

Figure 6 is a section on the line 6—6 of Figure 1;

Figure 7 is a fragmentary elevation as in Figure 3, but showing a grinding wheel disposed in place of the saw;

Figure 8 is an elevation of the lower forward portion of a Fordson engine showing the depending lugs thereof broken away and showing the connection to the sawing frame.

Referring to these drawings, it will be seen that my improved attachment comprises an approximately U-shaped supporting frame, designated generally 10. This frame is provided with the two parallel uprights 11 and with a connecting portion or bight portion 12 which is adapted to extend down in front of the forward axle of the tractor. This bight portion 12 is rearwardly bent, as illustrated in Figure 1, so as to approximate the axle, and attached to this bight portion is a transversely extending brace plate 13 semi-circular in form and having a centrally disposed opening through which the usual crank commonly found on Fordson tractors passes and through which opening a bolt 14 may pass to engage the brace with the front axle of the tractor, as illustrated in Figure 8.

The frame 10 is formed preferably of angle iron, though channel iron might be used, and this frame is preferably so disposed that the flanges of the angle iron extend inward or toward each other. The frame is connected intermediate its ends by a transverse cap piece 15 which is rectangular in form and is provided with the downwardly extending marginal flanges 16 which are bolted or riveted to the angle irons 11, this cap piece being provided with a central opening 17 designed to receive and embrace the upper portion of the radiator R of the tractor, as shown in Figure 2.

Mounted upon the upper face of the uprights 11 are the slip joint members 18 which are formed of channel iron and are adapted to engage over the upper ends of the members 11. These slip joint members are formed with apertures 19 for the passage of a transverse brace 20. Riveted to the upper ends of these slip joint members 18 and extending at right angles to the uprights 11 is a U-shaped supporting frame 21 of angle iron. The legs of this U-shaped frame 21 are riveted at their ends to the slip joint members 18, while the cross bar 22 of the U-shaped frame 21 is disposed remote from the supporting frame 10. The legs of this frame 21 are connected by a brace 23. The depending flanges of the two legs adjacent their forward ends are formed with a plurality of apertures 24 arranged in series.

Coacting with the forwardly projecting supporting frame is a cradle frame. This consists of two vertically disposed bars of angle iron, designated 25, with the flanges extending inward, these bars having a series of apertures 26 at their upper ends coacting with the apertures 24 to permit a pivot bolt 24ª to pass through the two apertures to thereby pivotally support the bars 25 and at their lower ends these bars 25 are forwardly and upwardly bent in a curve, as at 27. Resting upon the horizontal flanges of these curved portions 27 and extending up upon the vertical body portions of this cradle are the transversely extending boards 28 which are riveted, bolted or otherwise connected to these flanges so that the bars 25 move as a whole.

Mounted upon the vertical frame 10 are bearings 29, and disposed in these bearings is a transverse mandrel 30, to which a circular saw 31 is adapted to be attached. This mandrel at its end opposite the circular saw carries upon it a pulley 32 whereby the mandrel may be driven. Passing over this pulley 32 is a belt 33, which in turn passes over the usual pulley 34 of the tractor. It will be obvious now that the mandrel will be actuated by the engine and thus drive the saw and that any billets, logs or material designed to be sawed may be placed upon the cradle and then swung inward against the saw. As soon as the cradle is released, it will swing outward away from the saw, the frame 21 being sufficiently long so that the members 25 are supported vertically outward of the periphery of the saw. Inasmuch as the members 25 are pivotally mounted upon the frame 21, it follows that the cradle may be easily swung inward against the saw or outward.

The frames of which the attachment is composed, namely the frames 10 and 21 may be readily removed from the tractor or applied thereto, and it is obvious that the arms 25 may be readily removed from the frame 24 and that even with these parts in position there is no difficulty in operating the tractor in the usual and ordinary manner or moving it from place to place, or indeed using it for other driving purposes. The saw 31 is adapted to be readily removed from the saw mandrel 30 and a grinding wheel substituted in place of the saw. The grinding wheel is, of course, disposed at the side of the machine so that it is readily accessible and the cradle may be used for carrying any object into position against the grinding wheel if desired.

It will be seen that this device is very simple and readily operated, and it has been found very effective in actual practice. While I have illustrated this device as particularly adapted to be applied to a Fordson tractor, I do not wish to be limited to this as it is obvious that it may be readily applied to other forms of tractors by simply changing the size and certain of the details of the mechanism. The attachment is particularly adapted for cutting wood and sharpening or grinding mower blades, shears, plow disks and all kinds of tools, can be placed on and taken off of the tractor in less than a minute, and can be changed from a sawing attachment to a grinding attachment in less time than this.

I claim:—

1. An attachment of the character described comprising an approximately U-shaped supporting frame of angle iron, the closed end of the U-shaped frame being disposed downward and adapted to engage with the front axle of the tractor, means carried upon said frame for engaging with the radiator of the tractor to hold the frame in a vertical position, horizontal members detachably engaged with the upper ends of the frame and extending forward therefrom when the device is in place, a mandrel mounted upon the frame below its point of attachment to the radiator, and a log-carrying cradle embodying vertical arms pivotally connected to the horizontal members, the arms at their lower ends being forwardly extended, and connecting members attached to said forward extensions and connecting the two arms.

2. An attachment of the character described comprising a U-shaped supporting frame, the supporting frame at its closed end having attached thereto a transversely extending plate formed with an aperture whereby it may be connected to the forward axle of a tractor, a cap plate mounted upon said frame intermediate its ends and having an aperture which may be engaged over the upper end of the radiator of the tractor, a second U-shaped frame embodying a crossed bar and arms, the free ends of the arms having downwardly extending channel members adapted to fit over the members of the U-shaped supporting frame, a rod extending through said downwardly extending members and the vertical members of the supporting frame and connecting the two, the horizontal members being provided with a series of apertures, a cradle embodying vertical arms having a series of apertures adapted to register with any one of the apertures in the horizontal members, pivot bolts passing through said apertures and pivotally supporting the cradle, the lower ends of the arms forming the cradle being forwardly and upwardly extended, boards attached to said angularly bent portions upon which logs may be supported, and means for supporting a saw mandrel upon the first named supporting frame.

In testimony whereof I hereunto affix my signature.

WILLIAM M. BARBER.